Nov. 2, 1943.    W. H. BENNETT ET AL    2,333,144
METHOD AND APPARATUS FOR DISCHARGING ELECTRICITY FROM AIRCRAFT
Filed July 11, 1941    2 Sheets-Sheet 1

INVENTOR.
WILLARD H. BENNETT AND
RALPH MEAGHER
BY Charles B Belknap
ATTORNEY

Nov. 2, 1943.  W. H. BENNETT ET AL  2,333,144
METHOD AND APPARATUS FOR DISCHARGING ELECTRICITY FROM AIRCRAFT
Filed July 11, 1941  2 Sheets-Sheet 2

INVENTOR.
WILLARD H. BENNETT AND
RALPH MEAGHER
BY Charles B Belknap
ATTORNEY

Patented Nov. 2, 1943

2,333,144

UNITED STATES PATENT OFFICE 2,333,144

METHOD AND APPARATUS FOR DISCHARGING ELECTRICITY FROM AIRCRAFT

Willard H. Bennett and Ralph Meagher, Newark, Ohio, assignors, by mesne assignments, to Games Slayter, Newark, Ohio Application July 11, 1941, Serial No. 402,040

15 Claims. (Cl. 175—264)

This invention relates generally to a method and apparatus for discharging electricity from aircraft.

It is well known that aircraft acquires a charge of static electricity when flown through an area containing charged particles and that the current, resulting from this static charge, is discharged from some portion of the aircraft. The discharge of current from the aircraft often times causes interference with radio reception and seriously jeopardizes navigation of the aircraft.

The above phenomenon has proved so serious that considerable experimental work has been conducted in an effort to devise equipment which will satisfactorily control the electrical discharge from aircraft so that this discharge will not interfere with radio reception. One method which has achieved considerable recognition in the past is the distribution of pointed rods over different portions of the aircraft with the hopes that the current, resulting from the static charge on the aircraft, would discharge from the points in a radio silent manner. Although the above method appeared to be the most simple solution to the problem from a practical point of view, nevertheless, no one has been able to perfect this method to the point where the results obtained are sufficiently satisfactory to warrant adopting the same.

Considerable research work in this particular field leads us to believe that prior efforts to solve this problem failed because lack of knowledge of the phenomenon and because of the lack of appreciation of the following controlling factors, to wit: (1) sharpness of the pointed ends of the rods; (2) length of rods or, in other words, the relationship of the pointed ends of the rods with respect to the field as compared to the surface of the aircraft from which the rods project; (3) location of the rods with respect to each other and with respect to different portions of the aircraft; (4) number of points at each location; (5) location of the points with respect to the radio antenna; and (6) hooding of the pointed ends of the rods.

Many of the above factors are of extreme importance because they cooperate to provide a balanced condition wherein all of the points coact to discharge sufficient current to remove a given static charge from the aircraft and wherein the value of the current discharged from each point is not only substantially the same but is, also, below a maximum value known to cause radio interference. It is, therefore, one of the principal objects of this invention to provide equipment of the point discharge type characterized in that the equipment is balanced to enable a substantial amount of static electricity to discharge from the aircraft without seriously interfering with radio reception.

It follows from the above that in order to obtain the most satisfactory results, the installation must be custom built, so to speak, for each different model aircraft, and the present invention further contemplates a novel method and apparatus for placing an electrical charge on the aircraft so that the discharge equipment may be properly installed.

The foregoing, as well as other objects, will be made more apparent as this description proceeds, especially when considered in connection with the accompanying drawings, wherein.

Figure 1:
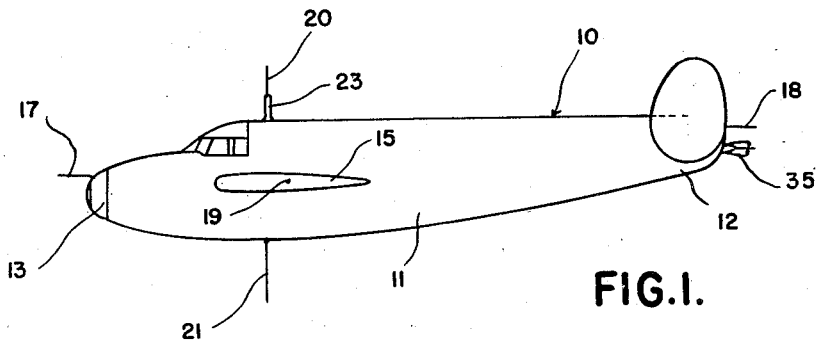
Figure 1 is a side elevational view of an aircraft equipped with electric discharge apparatus constructed and arranged in accordance with this invention.
Figure 2:
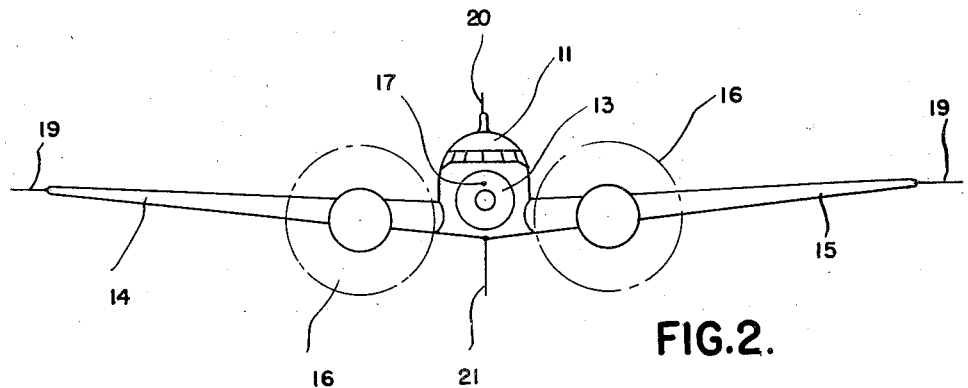
Figure 2 is a front elevational view of the construction shown in Figure 1.

In Figures 1 and 2 of the drawings, I have illustrated a conventional airplane 10 comprising a fuselage 11, a tail portion 12, a nose portion 13, and a pair of wings 14 and 15, respectively, extending laterally outwardly from opposite sides of the fuselage. In accordance with orthodox design, a motor is mounted on each wing and a propeller 16 is driven by each motor.

In the event the airplane, briefly described above, is flown into an area of charged particles, the airplane accumulates an electrical charge and an electrical field is produced around the airplane. This electrical field is more concentrated adjacent the most exposed parts of the airplane, such as the wing tips, propeller tips, nose and tail portions thereof. The current, resulting from the electrical charge on the airplane, is discharged from one or all of the above parts of the airplane and this discharge is often times sufficiently disruptive in character to cause serious interference with radio reception.

In other words, there is no provision in conventional aircraft construction for controlling the amount of current discharged from any one or all of the parts of the aircraft mentioned above and, in the absence of such control, the current discharged from one or more parts of the aircraft may reach such proportions as to render radio reception impossible. As stated above, it has been proposed to control the discharge by placing pointed rods on different parts of the aircraft. However, exhaustive experimental work has revealed that the problem is not solved by merely locating pointed rods on different portions of the aircraft. Such procedure may and has resulted in discharging currents from one or more of the points of a value in the so-called "radio noisy" range.

The present invention contemplates the use of pointed rods for discharging the aircraft in a radio silent manner because these points may be readily installed and the installation does not appreciably add to the weight of the aircraft. However, in accordance with this invention, the pointed rods are balanced so that the electrical charge on the aircraft is divided equally between the various pointed rods. It will also be apparent as this description proceeds that the number of pointed rods and the locations of the latter on the aircraft is predetermined so that a substantial amount of current may be discharged from the aircraft without overloading any one pointed rod to the point where the discharge interferes with radio reception.

It may be pointed out at this time that the amount of current deposited on aircraft during a storm condition depends on the intensity of the storm and the area of the aircraft exposed to the charged particles. It has been found that the average storm condition will deposit an electrical charge as high as 50 microamperes on an aircraft having a relatively large frontal area. In accordance with this invention, however, the above charge is equally divided between a plurality of pointed rods so that only a small portion of the total amperage is discharged from any one of the points. This fraction of the total amperage is well below the "radio noisy" range and can be successfully handled with a considerable margin of safety.

It should be understood that the value of 50 microamperes previously referred to does not represent the capacity of the installation about to be described. On the contrary, the installation or equipment forming the subject matter of this invention has a current dissipation factor well above 50 microamperes. In fact, the capacity of this equipment is beyond the point where it is safe for aircraft travel, and long before this capacity is approached, the aircraft should be grounded or navigated around the storm area. The means employed in conjunction with this equipment for warning the pilot of dangerous storm conditions forms the subject matter of another invention and is set forth in the Willard H. Bennett application, Serial No. 402,039, filed July 11, 1941.

With the above in mind, reference is again made to the drawings wherein it will be noted that at least one sharp pointed rod or discharge point is mounted on each of the following portions of the aircraft; the nose 13, the tail 12, each of the wing tips, the top of the fuselage and the bottom of the fuselage. The sharp pointed rods are designated in the drawings by the reference characters 17, 18, 19, 20 and 21. It will, of course, be understood that additional points or sharp pointed rods similar to the ones illustrated may be placed at other portions of the aircraft which are liable to release charge and, therefore, the number as well as the location of the sharp pointed rods will depend to some extent on the particular design of the aircraft to be equipped.

Regardless of the particular locations of the pointed rods on the aircraft, the installation must be such that a predetermined maximum electrical charge on the aircraft is discharged from the points and the value of the current discharged from any one point is not only substantially equal to the value of the current discharged from any other point but, in addition, is less than the value known to cause interference with radio reception. There are a number of factors which control the above balanced operation and the most important may be listed as follows: (1) length of sharp pointed rods with respect to the portion of the aircraft on which they are mounted; (2) included angle of the pointed end of the rod or, in other words, sharpness of the point; (3) number of pointed rods at each location; (4) hooding of points; and (5) contour of the portion of the aircraft from which the points project.

With respect to the lengths of the pointed rods, it is to be noted that these rods must be long enough so that the relationship of the pointed ends of the rods to the electrical field around the aircraft is sufficiently greater than the adjacent portions of the aircraft to insure discharge from the points rather than from the portions of the plane. Notwithstanding the above limitation, the length of the pointed rods at each location is important in controlling the amount of current discharged from the aircraft and, in all probability, certain of the pointed rods will have to be longer than other pointed rods in order to obtain the controlled discharge previously referred to. For example, certain portions of the aircraft may have a tendency to draw more current than other portions and this unbalanced condition must be compensated for by adjusting the lengths of the rods. From the above it will be noted that the amount of current drawn by one or more portions of the aircraft may be greater than one pointed rod at each of these locations is capable of handling without causing radio interference. In a case of this character, a plurality of pointed rods are provided at each location so that the current is divided equally between the pointed rods. Thus, the number of pointed rods required at any one location will depend to a great extent on the amount of current to be discharged from this location, and, in any case, a sufficient number of points should be provided to handle a given quantity of discharge current without overloading any one pointed rod to the point where the discharge is of such a high value as to cause radio interference.

Figure 7:
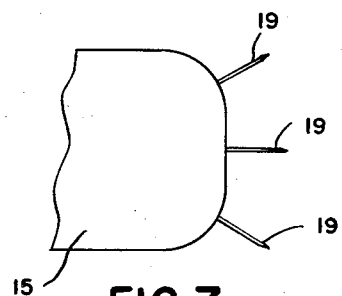
Figure 7 is a fragmentary top plan view of one of the wing tips.

As an example of the above, attention is called to Figure 7 wherein it will be noted that three pointed rods 19 are provided on one wing tip. These pointed rods will discharge all of the current drawn by the wing tip and yet the current discharged from any one of these points is maintained substantially less than the current range known to cause radio interference. In some instances it may be necessary to extend a pointed rod a substantial distance from the adjacent portion of the aircraft in order to avoid electrical discharge from the latter portion and, at the same time, limit the current discharged from this point. Such a case is shown in connection with the pointed rod 20 extending above the top of the fuselage 11 and is taken care of by "hooding" the pointed end of the rod by a member 23.

Reference has also been made above to the sharpness or the included angle of the point. In practically all cases, the pointed ends of the rods should be "needle" sharp because it has been found that the discharge from the sharp points is more steady and less disruptive. This, of course, is important in cases where it is essential to effect the discharge without causing interference with radio reception. It follows from the above that care should also be taken in selecting the material from which the pointed rods are formed. The material used should offer the greatest resistance to oxidation at the point of the rod, and particularly satisfactory results have been obtained by plating the steel points of the discharge rods with chromium or rhodium. Some precious metals may also be used for the above purpose if desired.

Particular attention is called to the pointed discharge rods 20 and 21. The purpose of these points is to prevent disruptive electrical discharges from the propeller tips which, during rotation, extend for some distance into the electrical field above and below the aircraft. The pointed rods 20 and 21, however, are not only considerably more sharp than the propeller tips but, in addition, are longer so that these points will prevent electrical discharges of any consequence from the tips of the propellers.

Figure 3:
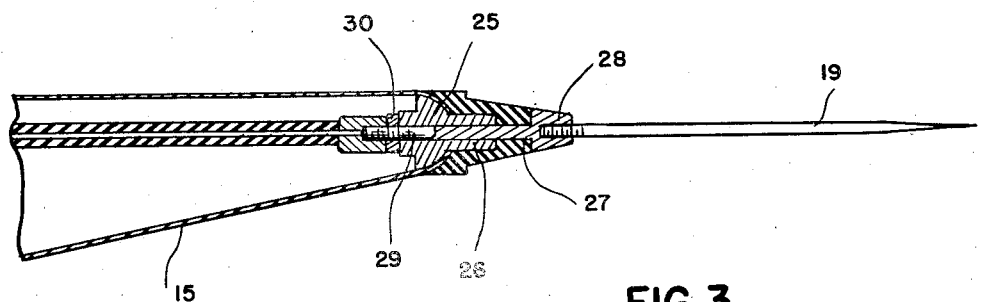
Figure 3 is a sectional view showing one method of securing the points to a part of the aircraft.
Figure 4:
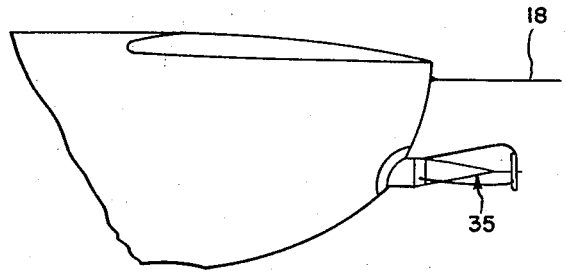
Figure 4 is a fragmentary elevational view of the tail portion of the aircraft.

In Figure 3 of the drawings, we have shown a typical mounting for one of the pointed rods. More particularly, the connection between the rod 19 and the tip of the wing 15 is shown. In detail, a clamp 25 is supported in the wing tip and is provided with a reduced portion 26 which extends laterally through an opening in the edge of the wing tip. The reduced portion 26 projects into a recess formed in a block 27 of insulating material and the latter engages the outer skin of the wing opposite the clamp 25. A stud 28 has a shank 29 which extends through the block 27 and clamp 25. The inner end of the shank 29 is threaded for receiving a clamping nut 30 and the head of the stud has a threaded bore for receiving the inner end of the pointed rod 19. This general type of mounting may be used for all of the pointed rods and the block of insulating material 27 may be employed as a hood for the point if desired. In the case of the pointed rod 20, the block of insulating material and associated parts may be longer to provide the desired hooding for this point.

Figure 5:
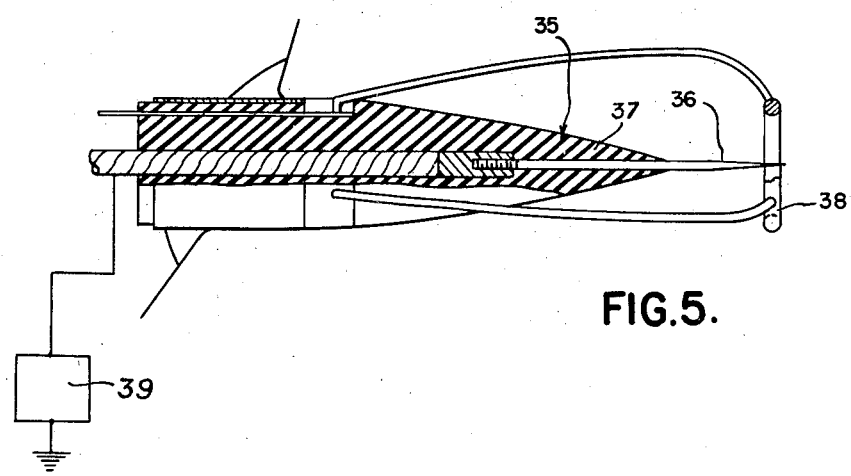
Figure 5 is a semi-diagrammatic view partly in section showing one type of device for charging the aircraft.
Figure 6:
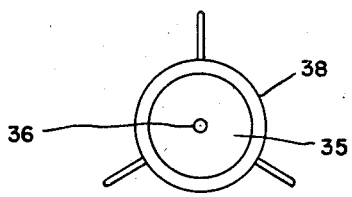
Figure 6 is an end elevational view of the charger shown in Figure 5.

As pointed out above, it is essential that the discharge points be properly adjusted with respect to the particular airplane upon which they are installed so as to control the current discharged therefrom. In order to initially effect the proper installation, it is necessary to put an electrical charge on the aircraft. This is accomplished in the present instance by attaching a charger 35 on the tail portion of the aircraft. This charger comprises a discharge point 36 having the inner end secured in a conical-shaped holder 37 of insulating material. The holder 37 is attachable in any suitable manner to the tail portion 12 of the aircraft and also supports a target electrode 38 in the form of a ring surrounding the tip of the point in the manner shown in Figure 5. The inner end of the point 36 is electrically connected to the output of a high voltage rectifier 39 supported in any suitable manner in the aircraft and capable of energizing the point 36 with a high voltage direct current. The target electrode 38 is grounded on the aircraft and, as as result, a steady direct current discharge of ions takes place from the point 36 toward the ring electrode 38.

The ring electrode 38 is located in the air stream and the air passing through the ring operates to blow the ions from the aircraft. For example, if the discharge current at the tip of the point 36 is between 100 and 200 microamperes, the field intensity through substantially half of the radial gap is less than 5 kv. per centimeter. At 5 kv. per centimeter, the velocity of ions is about 200 miles per hour and for an airplane velocity of the same magnitude, the ions will be blown to the rear of the target electrode and, because of rapidly diminishing field intensities, are blown completely away from the airplane. It will, of course, be understood that either polarity of charge can be put on the airplane by merely reversing the polarity of the direct current applied to the point 36.

The electrical charge put on the aircraft by the charger 35 is, of course, discharged from the aircraft by the pointed rods extending from the different parts of the aircraft previously discussed. Each of the pointed rods 18 to 21, inclusive, are electrically connected to a microammeter (not shown) and by reading these instruments, the current discharged from each point may be determined with respect to the other points. The length of the pointed rods and the degree of "hooding" of each point is then adjusted until the charging current from the charger is distributed equally to the various discharge points for all altitudes and under normal fair weather flying conditions. Also, care is taken during this initial test to provide sufficient electrodes at the desired parts of the aircraft to insure maintaining the value of the current discharged by the points below the range where the discharge causes interference to radio reception. After the above installation is properly made, the charger 35 as well as the various meters may be removed if desired and the points will operate satisfactorily to discharge static electricity from aircraft in flight.

In describing this invention, particular stress has been placed upon the fact that for a given amount of electrical charge on the aircraft, the current discharged from each pointed rod is not only equal but is less than a predetermined maximum value known to cause interference to radio reception. This predetermined maximum value is highly variable and depends to a great extent on the distance between the pointed rods and radio equipment. In general, it may be stated that each pointed rod will dissipate currents up to 50 microamperes before the discharge has any effect on radio reception.

What we claim as our invention is:

1. In a method of discharging electricity from aircraft in flight those steps which consist in placing sharp pointed rods on the portions of the aircraft from which electricity is most likely to discharge, and adjusting the effective lengths of the pointed rods with reference to the surfaces from which the rods project so that each pointed rod will discharge the same amount of current.

2. In a method of discharging electricity from aircraft in flight those steps which consist in placing sharp pointed rods on the portions of the aircraft from which electricity is most likely to discharge, and predetermining the number of rods at each location in accordance with the amount of current to be discharged from this location so that for a given amount of electrical charge on the aircraft the current discharged from any one of the rods is less than a predetermined maximum value.

3. In a method of discharging electricity from aircraft in flight those steps which consist in placing sharp pointed rods on the portions of the aircraft from which electricity is most likely to discharge, and controlling the discharge from the rods so that the value of the current discharged from any one pointed rod is substantially equal to the value of the current discharged from any one of the other pointed rods.

4. In a method of discharging electricity from aircraft in flight those steps which consist in placing sharp pointed rods on the portions of the aircraft from which electricity is most likely to discharge, controlling the discharge from the rods so that for a given amount of electrical charge on the aircraft the value of the current discharged from any one pointed rod is less than a predetermined maximum value and so that each discharge point will discharge substantially the same amount of current.

5. In a method of discharging electricity from aircraft in flight those steps which consist in placing sharp pointed rods on the portions of the aircraft from which electricity is most likely to discharge, predetermining the number of rods at each location in accordance with the amount of current to be discharged from this location so that for a given electrical charge on the aircraft the current discharged from any one of the rods is less than a predetermined maximum value, and controlling the discharge from the pointed rods so that the value of the current discharged from any one of said pointed rods is substantially equal to the value of the current discharged from any one of the other pointed rods.

6. In a method of discharging electricity from aircraft having a motor driven propeller, those steps which consist in extending sharp pointed rods into the field above and below the aircraft for discharging the electricity which would disruptively discharge from the propeller tips in the absence of said pointed rods, and controlling the discharge from the pointed rods so that substantially the same amount of current is discharged from each pointed rod.

7. The method of installing electric discharge equipment on aircraft comprising the steps of placing an electrical charge on the aircraft, removing the electrical charge from the aircraft by positioning pointed rods on different parts of the aircraft, and adjusting the effective lengths of the pointed rods so that substantially the same amount of current is discharged from each rod.

8. The method of installing electric discharge equipment on aircraft comprising the steps of placing an electrical charge on the aircraft, removing the electrical charge from the aircraft by positioning pointed rods on the portions of the aircraft from which charge is most likely to escape, adjusting the pointed rods with respect to the adjacent portions of the aircraft until subsantially equal amounts of current are discharged by each rod, and varying the number of pointed rods so that the desired amount of current is discharged from the aircraft without overloading any one pointed rod to the point where the discharge causes interference with radio reception.

9. Electric discharge equipment for aircraft comprising sharp pointed rods extending outwardly from different portions of the aircraft and each pointed rod having an effective length so determined with respect to the effective lengths of the other pointed rods that substantially the same value of current is discharged from each point.

10. Electric discharge equipment for aircraft having instrumentalities which are detrimentally affected by the discharge from the aircraft of static electricity above a certain value comprising sharp pointed rods projecting outwardly from different portions of the aircraft a sufficient distance to insure electrical discharge from the points instead of from the adjacent parts of the aircraft and having effective lengths predetermined so that for a given amount of electrical charge on the aircraft the value of current discharged from any one point is below the value which seriously affects the instrumentalities aforesaid.

11. Electric discharge equipment for aircraft comprising sharp pointed rods extending outwardly from different portions of the aircraft, each rod having a potential drop so determined with respect to the potential drop of the other rods that the same value of current is discharged from each rod.

12. Electric discharge equipment for aircraft having a fuselage and wings extending laterally outwardly from opposite sides of the fuselage and also having instrumentalities which are detrimentally affected by the discharge from the aircraft of static electricity above a certain value, said equipment comprising pointed rods extending outwardly from the wing tips, nose and tail of the fuselage, said rods having an effective length predetermined so that for a given electrical charge on the aircraft the maximum current discharged from any one of the points is less than the value which seriously affects the instrumentalities aforesaid.

13. Electric discharge equipment for aircraft having a fuselage and having a motor driven propeller, said equipment comprising sharp pointed rods extending vertically from the top and bottom of the fuselage in proximity to the propeller, the effective lengths of the rods being predetermined so that the value of current discharged from each point is substantially the same.

14. Electric discharge equipment for aircraft having a fuselage, wings projecting laterally outwardly from opposite sides of the fuselage and a motor driven propeller, said equipment comprising sharp pointed rods extending outwardly from the wing tips, nose and tail of the fuselage, additional sharp pointed rods projecting vertically from the top and bottom of the fuselage in proximity to the propeller, each pointed rod having an effective length so determined with respect to the other pointed rods that the value of current discharged from any one point is the same as the value of current discharged from any other point.

15. Electric discharge equipment for aircraft having a fuselage and having a motor driven propeller, said equipment comprising sharp pointed rods extending vertically from the top and bottom of the fuselage in proximity to the propeller and each rod having a potential drop so determined with respect to the potential drop of othe other rod that both rods discharge the same value of current.

WILLARD H. BENNETT.
RALPH MEAGHER.